L. NEAL.
COOKING UTENSIL.
APPLICATION FILED OCT. 13, 1910.
1,009,334.
Patented Nov. 21, 1911.
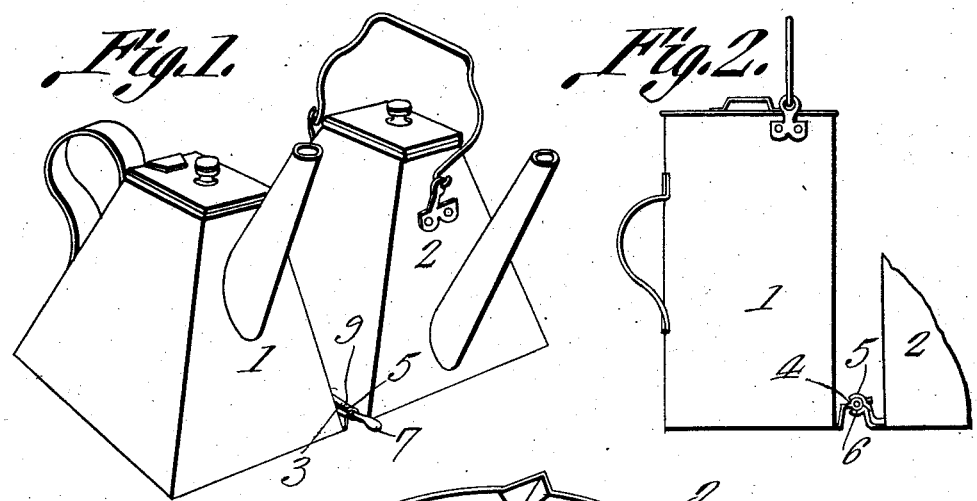
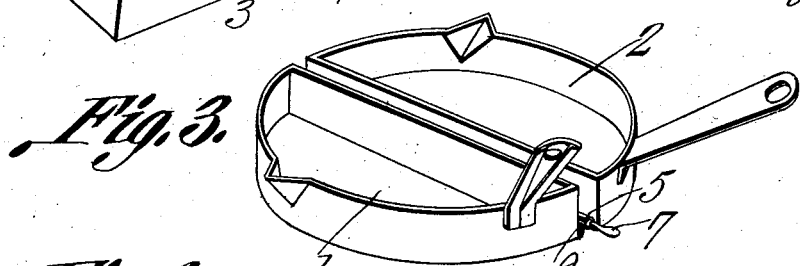
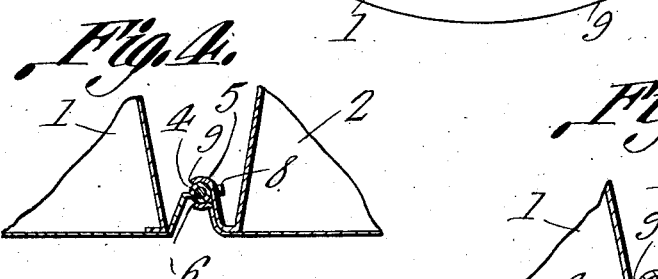
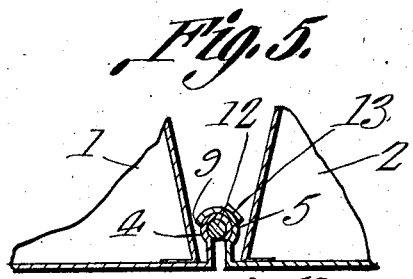
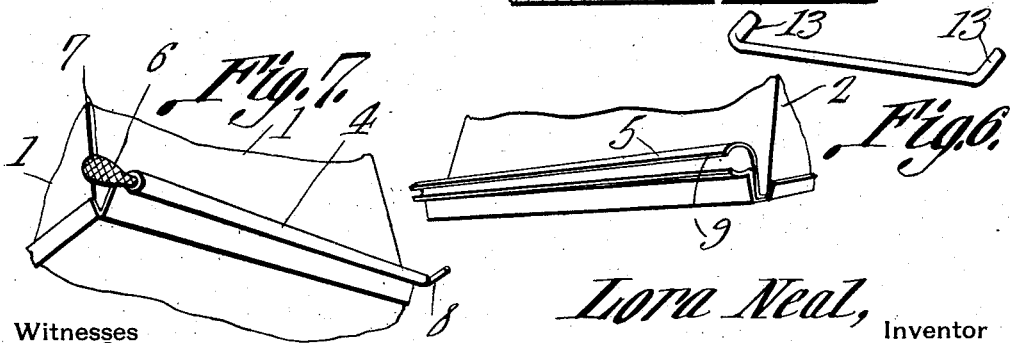
Lora Neal, Inventor
Witnesses
by C. A. Snow & Co.
Attorneys

UNITED STATES PATENT OFFICE.

LORA NEAL, OF BENTON, ILLINOIS.

COOKING UTENSIL.

1,009,334.  Specification of Letters Patent.  Patented Nov. 21, 1911.

Application filed October 13, 1910. Serial No. 586,938.

*To all whom it may concern:*

Be it known that I, LORA NEAL, a citizen of the United States, residing at Benton, in the county of Franklin and State of Illinois, have invented a new and useful Cooking Utensil, of which the following is a specification.

This invention relates to cooking utensils, and more particularly to twin devices designed to be placed over a single burner of the usual form of gas range.

One of the objects of the invention is to provide novel means whereby the two sections of the cooking receptacle may be detachably connected, to permit one receptacle to be emptied without disturbing the other and to permit an oscillating motion of either of the receptacles, so that the contents of either may be agitated.

Another object of the invention is to provide means whereby when one of the receptacles is lifted from the burner by means of its handle the other is also lifted without tilting.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings the preferred form of the invention has been shown.

In said drawings:—Figure 1 is a perspective view of two cooking receptacles detachably joined together. Fig. 2 is a view in elevation of two other forms of receptacles detachably joined together. Fig. 3 is a view in perspective, of two frying or broiling pans, also joined together in the manner disclosed in Figs. 1 and 2. Fig. 4 is a section showing on an enlarged scale the adjoining portions of the structure disclosed in Fig. 1. Fig. 5 is a similar view illustrating a modified connection. Fig. 6 is a perspective view of a part of the connection shown in Fig. 5. Fig. 7 is a view in perspective, showing the two hinge members separated.

Referring to the figures by characters of reference 1 and 2 designate cooking receptacles, which may be either a tea and coffee pot, a pail and bucket, or two pans, as shown in Figs. 1, 2 and 3, or any other forms of receptacle. However, the receptacle forms no part of the present invention. Between the receptacles, a telescopic connection 3 is provided. The telescopically connected tubes 4 and 5 are tapered, the tube 4 being provided with a rod 6 extending through it. This rod has a knurled handle 7, whereby the same may be rotated to permit the angle end 8 thereof to lock behind the small end of the tube 5. To separate the two receptacles, it is necessary to impart a sliding motion to one or the other, but before this can be accomplished, the rod 6 must be rotated, to bring the angle end 8 into register with a slot 9 in the tube 5, after which the receptacles may be easily slid apart, the angle end 8 moving along the slot 9. It will be noted that the slot 9 is of a width, sufficient to permit either of the receptacles to be oscillated relative to the other to agitate its contents.

In the structure shown in Fig. 5, the telescopically connected tubes 4 and 5 are not to be tapered but are of uniform diameter throughout their length. The tube 5 has a slot 9, and extending through the bore 4 is a rod 12, having at each end an angle portion 13, and by partially rotating this rod 12, the two angle ends 13 may be brought in engagement with the ends of the tubes 4 and 5, thereby locking the two receptacles together.

When it is desired to disconnect the two receptacles, one of these ends 13, is brought into register with the slot 9, after which the receptacles can be slipped apart in the manner hereinbefore set forth.

It will be apparent that by connecting two receptacles in the manner described, both of them can be supported at one time over a single burner or stove opening.

What is claimed is:—

1. The combination with separate receptacles, of a longitudinally slotted tubular member upon one of the receptacles, a tubular member on the other receptacle and mounted to slide and rotate within the first mentioned member, and an element mounted for rotation within the inner tubular member and including means for holding it against removal from the inner member, one of said means being shiftable to engage the slotted tubular member to hold it against sliding movement relative to the inner member.

2. The combination of a pair of cooking receptacles, of a joint between the receptacles and including telescopically connected tubular tapered members, a rotatable rod mounted in one of the members and means on the rod to hold it against removal from the member in which it is mounted, one of said means being movable to engage the other member for preventing longitudinal movements of the members.

3. The combination of a pair of cooking receptacles, of a joint between the receptacles and including telescopically and pivotally connected tubular tapered members, and a rotatable rod extending through one of the members and embodying an angled portion to engage the other member to prevent longitudinal movements of the members in one direction, while the tapering of the members constitutes means for preventing movement of the members in the opposite direction.

In testimony that I claim the foregoing as my own, I have hereto affixed my signature in the presence of two witnesses.

LORA NEAL.

Witnesses:
CHAS. B. TEAGUE,
C. O. DIAL.

Copies of this patent may be obtained for five cents each, by addressing the "Commissioner of Patents, Washington, D. C."